(12) United States Patent
Wayans et al.

(10) Patent No.: US 8,771,048 B2
(45) Date of Patent: Jul. 8, 2014

(54) COMPUTER-IMPLEMENTED VIDEO PUZZLES

(75) Inventors: Damon Wayans, Thousand Oaks, CA (US); Martin Merik Pelletier, Los Angeles, CA (US)

(73) Assignee: WPC, LLC, New York, NY (US)

( * ) Notice: Subject to any disclaimer, the term of this patent is extended or adjusted under 35 U.S.C. 154(b) by 145 days.

(21) Appl. No.: 13/207,945

(22) Filed: Aug. 11, 2011

(65) Prior Publication Data

US 2012/0329540 A1 Dec. 27, 2012

Related U.S. Application Data

(60) Provisional application No. 61/500,926, filed on Jun. 24, 2011.

(51) Int. Cl.
  *A63F 9/24* (2006.01)
(52) U.S. Cl.
  USPC ............................................................ 463/9
(58) Field of Classification Search
  USPC ............................................................. 463/9
  See application file for complete search history.

(56) References Cited

U.S. PATENT DOCUMENTS

| | | | |
|---|---|---|---|
| 5,431,400 A * | 7/1995 | Metz | 273/157 R |
| 5,643,084 A | 7/1997 | Mirsky | |
| 5,643,085 A | 7/1997 | Aityan et al. | |
| 6,062,978 A | 5/2000 | Martino et al. | |
| 6,264,198 B1 | 7/2001 | Stamper | |
| 6,452,515 B1 | 9/2002 | Duquesnois et al. | |
| 6,756,534 B2 | 6/2004 | Gimpelson et al. | |
| 6,893,341 B2 | 5/2005 | Walker et al. | |
| 7,878,891 B2 | 2/2011 | Chiu | |
| 2001/0049297 A1 | 12/2001 | Hibscher et al. | |
| 2005/0054407 A1 | 3/2005 | Kinzer et al. | |
| 2006/0089193 A1 * | 4/2006 | Buecheler et al. | 463/23 |
| 2007/0243919 A1 | 10/2007 | Thelen et al. | |
| 2008/0254419 A1 * | 10/2008 | Cohen | 434/219 |
| 2008/0261673 A1 * | 10/2008 | Buecheler et al. | 463/9 |
| 2009/0017908 A1 | 1/2009 | Miyamoto | |
| 2009/0088235 A1 | 4/2009 | Stein, III | |
| 2009/0258687 A1 | 10/2009 | Weichselbaum | |
| 2010/0069133 A1 | 3/2010 | Takeda | |
| 2010/0125795 A1 | 5/2010 | Yu et al. | |
| 2011/0052144 A1 | 3/2011 | Abbas et al. | |
| 2012/0166294 A1 * | 6/2012 | Lieberman et al. | 705/14.72 |

OTHER PUBLICATIONS

Tennenhouse, David L. et al. "A Software-Oriented Approach to the Design of Media Processing Environments", Telemedia, Networks & Systems Group, Laboratory for Computer Science Massachusetts Institute of Technology, Cambridge, MA, pp. 1-26, (1994).

* cited by examiner

*Primary Examiner* — Pierre E Elisca
(74) *Attorney, Agent, or Firm* — Volpe and Koenig, P.C.

(57) ABSTRACT

Described herein is a video puzzle application that provides three different types of video puzzles. In each of the video puzzles, a video is divided into a sequence of video data segments. To solve the puzzles, the user indicates the correct order for the video data segments, and/or associates visual components of the video data segments with their corresponding audio components. In the first type of video puzzle, a user solves the puzzle by indicating the correct order for video data segments using drag and drop operations. In the second type of video puzzle, a user solves the puzzle by indicating the correct order of the video data segments using numbered icons that represent the correct positions of the segments. In the third type of video puzzle, a user solves the puzzle by indicating associations between audio components and video components of the video data segments.

20 Claims, 16 Drawing Sheets

402

| VIDEO DATA SEGMENT | FRAMES IN VIDEO | VIDEO DATA SEGMENT ICON | POSITION IN SEQUENCE |
|---|---|---|---|
| SEGMENT A | 1-100 | VDSI A | 1 |
| SEGMENT B | 101-200 | VDSI B | 2 |
| SEGMENT C | 201-300 | VDSI C | 3 |
| SEGMENT D | 301-400 | VDSI D | 4 |
| SEGMENT E | 401-500 | VDSI E | 5 |
| SEGMENT F | 501-600 | VDSI F | 6 |
| SEGMENT G | 601-700 | VDSI G | 7 |

406

| SEQUENCE POSITION ICON | POSITION IN SEQUENCE |
|---|---|
| SPI 1 | 1 |
| SPI 2 | 2 |
| SPI 3 | 3 |
| SPI 4 | 4 |
| SPI 5 | 5 |
| SPI 6 | 6 |
| SPI 7 | 7 |

400

404 PUZZLE RESULTS DATA

| VIDEO DATA SEGMENT | ORDER FOR SEGMENT CORRECTLY INDICATED? |
|---|---|
| SEGMENT A | FALSE |
| SEGMENT B | FALSE |
| SEGMENT C | FALSE |
| SEGMENT D | FALSE |
| SEGMENT E | FALSE |
| SEGMENT F | FALSE |
| SEGMENT G | FALSE |

| VIDEO DATA SEGMENT | FRAMES IN VIDEO | VIDEO DATA SEGMENT ICON | POSITION IN SEQUENCE |
|---|---|---|---|
| SEGMENT A | 1-100 | VDSI A | 1 |
| SEGMENT B | 101-200 | VDSI B | 2 |
| SEGMENT C | 201-300 | VDSI C | 3 |
| SEGMENT D | 301-400 | VDSI D | 4 |
| SEGMENT E | 401-500 | VDSI E | 5 |
| SEGMENT F | 501-600 | VDSI F | 6 |
| SEGMENT G | 601-700 | VDSI G | 7 |

406

| SEQUENCE POSITION ICON | POSITION IN SEQUENCE |
|---|---|
| SPI 1 | 1 |
| SPI 2 | 2 |
| SPI 3 | 3 |
| SPI 4 | 4 |
| SPI 5 | 5 |
| SPI 6 | 6 |
| SPI 7 | 7 |

400

404 PUZZLE RESULTS DATA

| VIDEO DATA SEGMENT | ORDER FOR SEGMENT CORRECTLY INDICATED? |
|---|---|
| SEGMENT A | FALSE |
| SEGMENT B | FALSE |
| SEGMENT C | TRUE |
| SEGMENT D | TRUE |
| SEGMENT E | FALSE |
| SEGMENT F | TRUE |
| SEGMENT G | FALSE |

| VIDEO DATA SEGMENT | FRAMES IN VIDEO | VIDEO DATA SEGMENT ICON | POSITION IN SEQUENCE |
|---|---|---|---|
| SEGMENT A | 1-100 | VDSI A | 1 |
| SEGMENT B | 101-200 | VDSI B | 2 |
| SEGMENT C | 201-300 | VDSI C | 3 |
| SEGMENT D | 301-400 | VDSI D | 4 |
| SEGMENT E | 401-500 | VDSI E | 5 |
| SEGMENT F | 501-600 | VDSI F | 6 |
| SEGMENT G | 601-700 | VDSI G | 7 |

406

| SEQUENCE POSITION ICON | POSITION IN SEQUENCE |
|---|---|
| SPI 1 | 1 |
| SPI 2 | 2 |
| SPI 3 | 3 |
| SPI 4 | 4 |
| SPI 5 | 5 |
| SPI 6 | 6 |
| SPI 7 | 7 |

400

404 PUZZLE RESULTS DATA

| VIDEO DATA SEGMENT | ORDER FOR SEGMENT CORRECTLY INDICATED? |
|---|---|
| SEGMENT A | TRUE |
| SEGMENT B | TRUE |
| SEGMENT C | TRUE |
| SEGMENT D | TRUE |
| SEGMENT E | TRUE |
| SEGMENT F | TRUE |
| SEGMENT G | TRUE |

*FIG. 4C*

COMPUTER-IMPLEMENTED VIDEO PUZZLES

CROSS REFERENCE TO RELATED APPLICATION

This application claims the benefit of U.S. Patent Application Ser. No. 61/500,926, filed on Jun. 24, 2011, which is incorporated by reference as if fully set forth.

BACKGROUND

In recent years, technologies for implementing electronic games and puzzles have become very popular. These technologies include a number of approaches for implementing puzzles, including video puzzles. While current video puzzles may possess positive features, they also are limited in their functionality and in the ways that they challenge users. For example, most video puzzles are purely two-dimensional graphical puzzles, and ask users only to analyze graphical aspects of the videos that are the subjects of the puzzles. Many aspects of the video medium that make the medium interesting and engaging—such as the interplay that exists in video between audio and visual images—are not used in today's video puzzles. Therefore, new approaches to video puzzles, such as the approaches described in detail below, would be advantageous.

SUMMARY

Described herein is a video puzzle application that implements functionally related to three different types of video puzzles. Also described herein are computer-readable media and apparatus for storing and executing the video puzzle application and displaying and processing data related to the video puzzle application. In each of the video puzzles in the video puzzle application, a video is divided into an ordered sequence of video data segments. To solve the puzzles, the user indicates the correct order for the video data segments, and/or associates visual components of the video data segments with their corresponding audio components. In the first type of video puzzle, a user solves the puzzle by indicating the correct order for video data segments using drag and drop operations. In the second type of video puzzle, a user solves the puzzle by indicating the correct order of the video data segments with numbered icons that represent the correct positions of the segments in the sequence. In the third type of video puzzle, a user solves the puzzle by indicating associations between audio components and video components of the video data segments.

BRIEF DESCRIPTION OF THE DRAWINGS

A more detailed understanding may be had from the following description, given by way of example in conjunction with the accompanying drawings wherein:

FIGS. 4A-4C show an example data structure that may be used by the video puzzle application;

DETAILED DESCRIPTION

As used herein, the terms "video" and "video data" refer to electronic data that represents a sequence of images. The sequential images in a video are referred to herein as "frames." Each image in a video may be a raster of pixels that has a width and a height. A video may also include audio data. A video may have characteristics such as a frame rate (which is the rate at which frames in the video are displayed, and which is frequently indicated as Frames Per Second (FPS)), and other characteristics. As used herein, the term "video data segment" refers to the data that makes up a portion of a video. For example, if a video is made up of 10,000 frames and corresponding audio, a video data segment that makes up the first half of the video would include the first 5,000 frames, the audio data that corresponds to the first 5,000 frames, and possibly additional information associated with the first 5,000 frames.

Described herein is a video puzzle application. The video puzzle application may be implemented as one or more software modules, one or more specific purpose processor elements, and/or any combination thereof. Among other features, the video puzzle application implements functionally related to three different types of video puzzles. In each of the video puzzles, a video is divided into a number of video data segments, and the user solves the puzzles by determining the correct order of the video data segments, and/or by associating visual components of the video data segments with their corresponding audio components. The first type of video puzzle (referred to a "drag and drop" type of video puzzle) is described in detail below with reference to, inter alia, FIGS. 3A-4C. The second type of video puzzle (referred to as a "fill in the blanks" type of puzzle) is described in detail below with reference to, inter alia, FIGS. 5A-5C. The third type of video puzzle (referred to as a "match the sound" type of puzzle) is described in detail below with reference to, inter alia, FIGS. 6A-6C. Examples of computer-readable media and electronic components that may be used for, among other purposes, storing and executing the video puzzle application and storing and processing data used by the video puzzle application are described in detail below with reference to, inter alia, FIG. 7.

Figure 1:
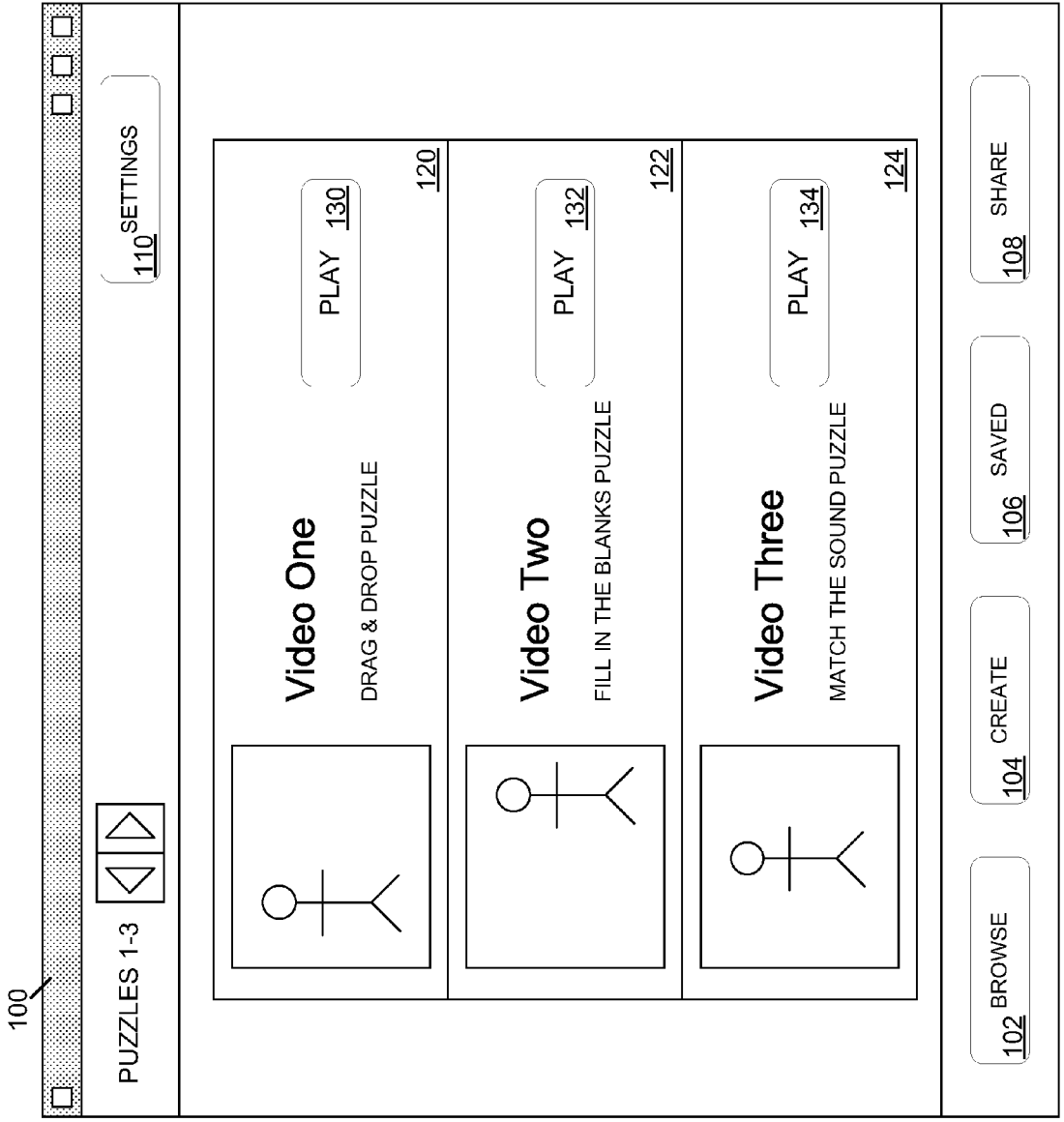
FIG. 1 shows a main window that is displayed by the video puzzle application described herein.

FIG. 1 shows a main window 100 that is displayed by the video puzzle application. This main window 100 is displayed when the video puzzle application first starts up, as well as at later times during the operation of the video puzzle application. As shown in FIG. 1, the main screen includes a Browse button 102, a Create button 104 button, a Saved button 106, a Share button 108, and a Settings button 110. Description of the functionality related to these buttons 102, 104, 106, 108, 110 is provided below.

The main window 100 also includes a first video puzzle information area 120, a second video puzzle information area 122, and a third video puzzle information area 124, each of which contains information related to a different video puzzle. The first puzzle information area 120 relates to a "drag and drop" puzzle, the subject of which is an example video named "Video One." The second video puzzle information area 122 relates to a "fill in the blanks" puzzle, the subject of which is a second example video named "Video Two." The third video puzzle information area 124 relates to a "match the sound puzzle," the subject of which is a third example video named "Video Three." Each of the video puzzle information areas 120, 122, 124 contains a Play button 130, 132, 134. By selecting any of the three Play buttons 130, 132, 134, the user may play the puzzle that is indicated in the corresponding video puzzle information area 120, 122, 124.

When the user selects the Play button 130 in the first video puzzle information area 120, the video puzzle application may display a window that includes further information related to the video puzzle to which the first video puzzle information area 120 relates.

Figure 2:
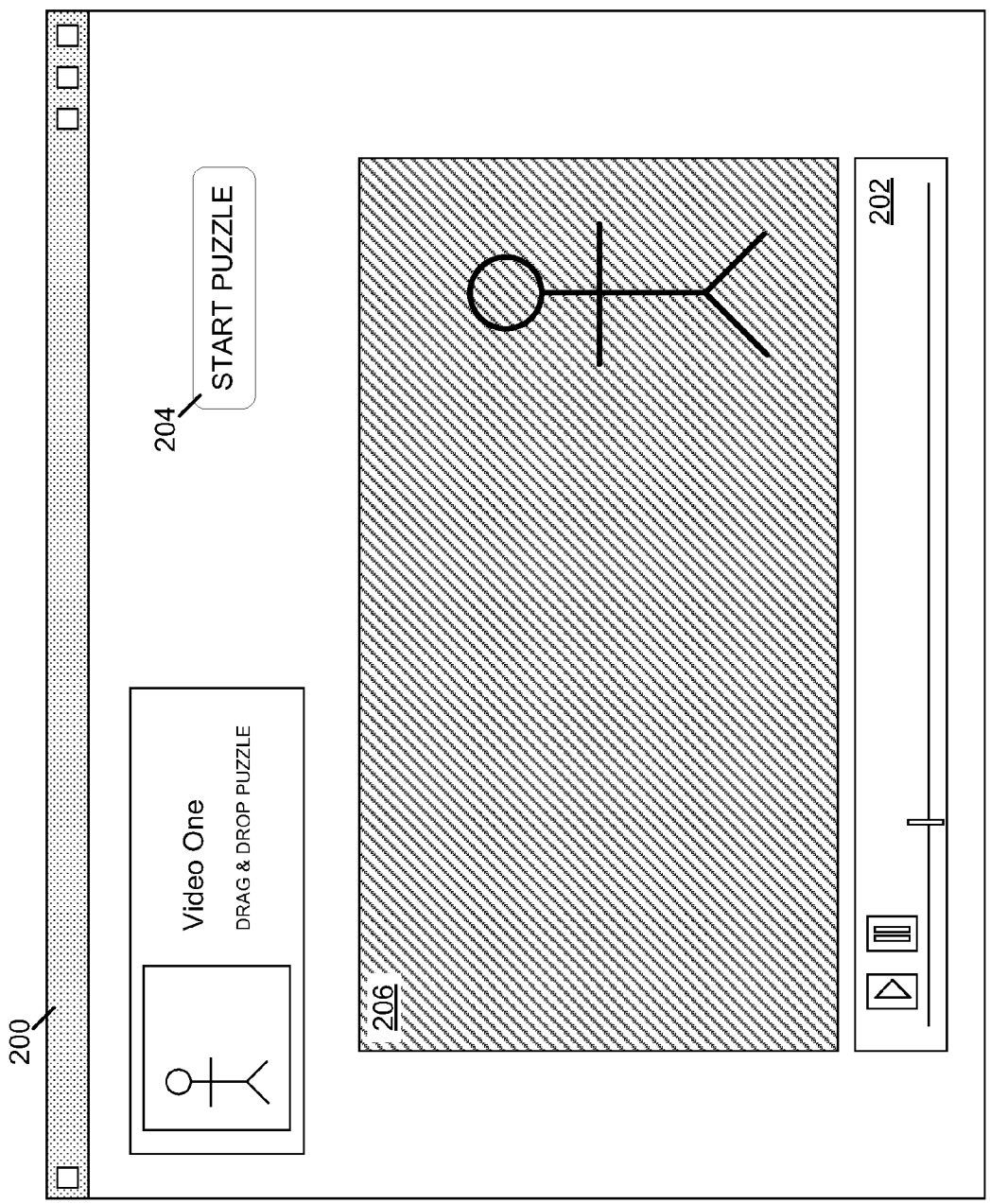
FIG. 2 shows a window that is displayed by the video puzzle application for previewing a video that is the subject video for a video puzzle.

Referring now to FIG. 2, FIG. 2 shows an example window 200 that the puzzle application may display in response to a selection of the Play button 130 in the first video puzzle information area 120. The window 200 of FIG. 2 is a "preview" window that may be used to play Video One. The window 200 includes a control area 202, a Start Puzzle button 204, and a video display area 206. Using the controls in the control area 202, the user may watch the entirety of Video One, or any portion thereof, in the video display area 206. When the user wishes to play the Video One puzzle, the user may select the Start Puzzle button 204 shown in the window 200 of FIG. 2. In response to the selection of the Start Puzzle button 204, the video puzzle application displays a window for playing the Video One Puzzle.

Figure 3A:
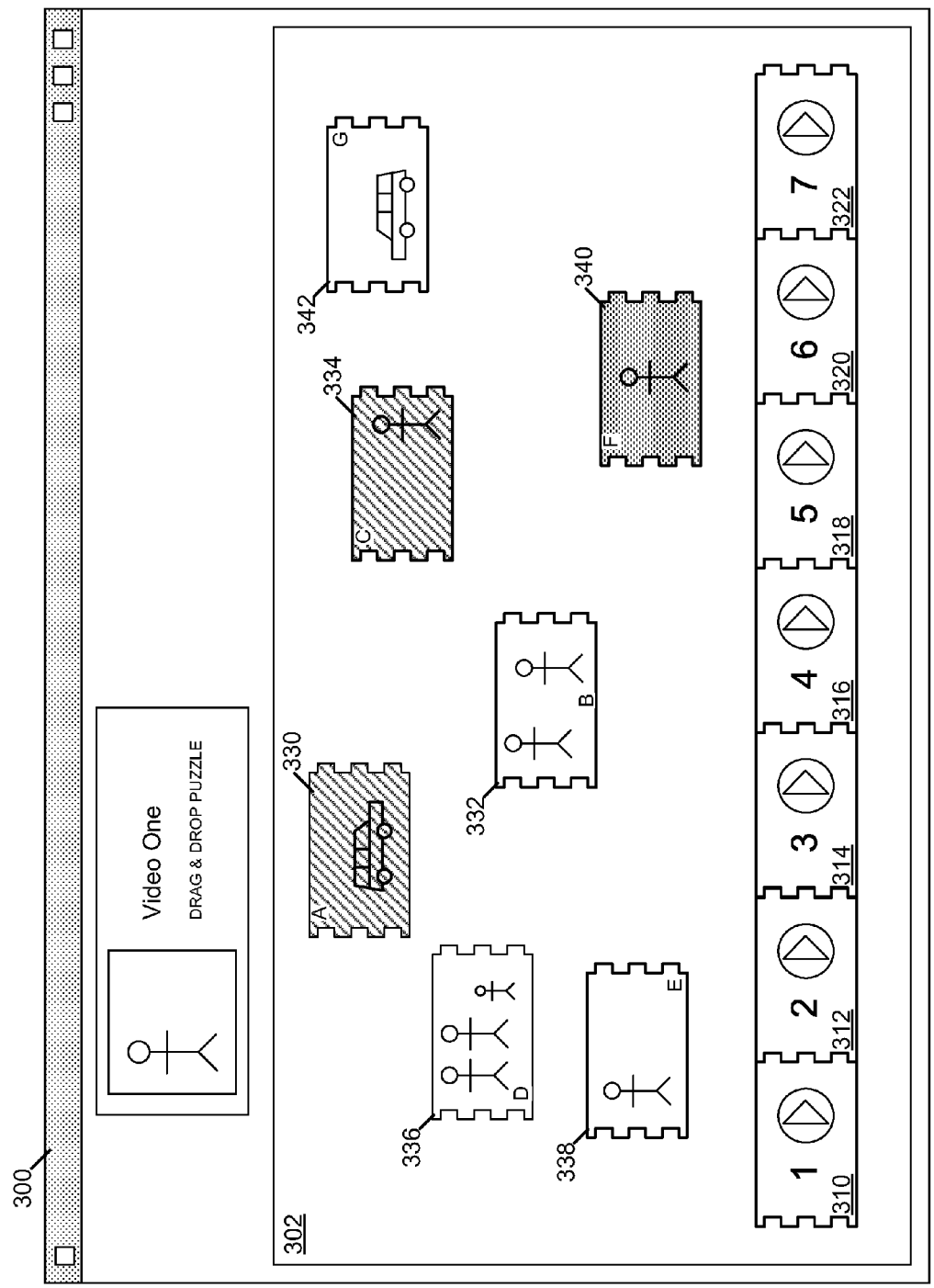
FIGS. 3A-3D show a window that is displayed by the video puzzle application for a first type of video puzzle.
Figure 3B:
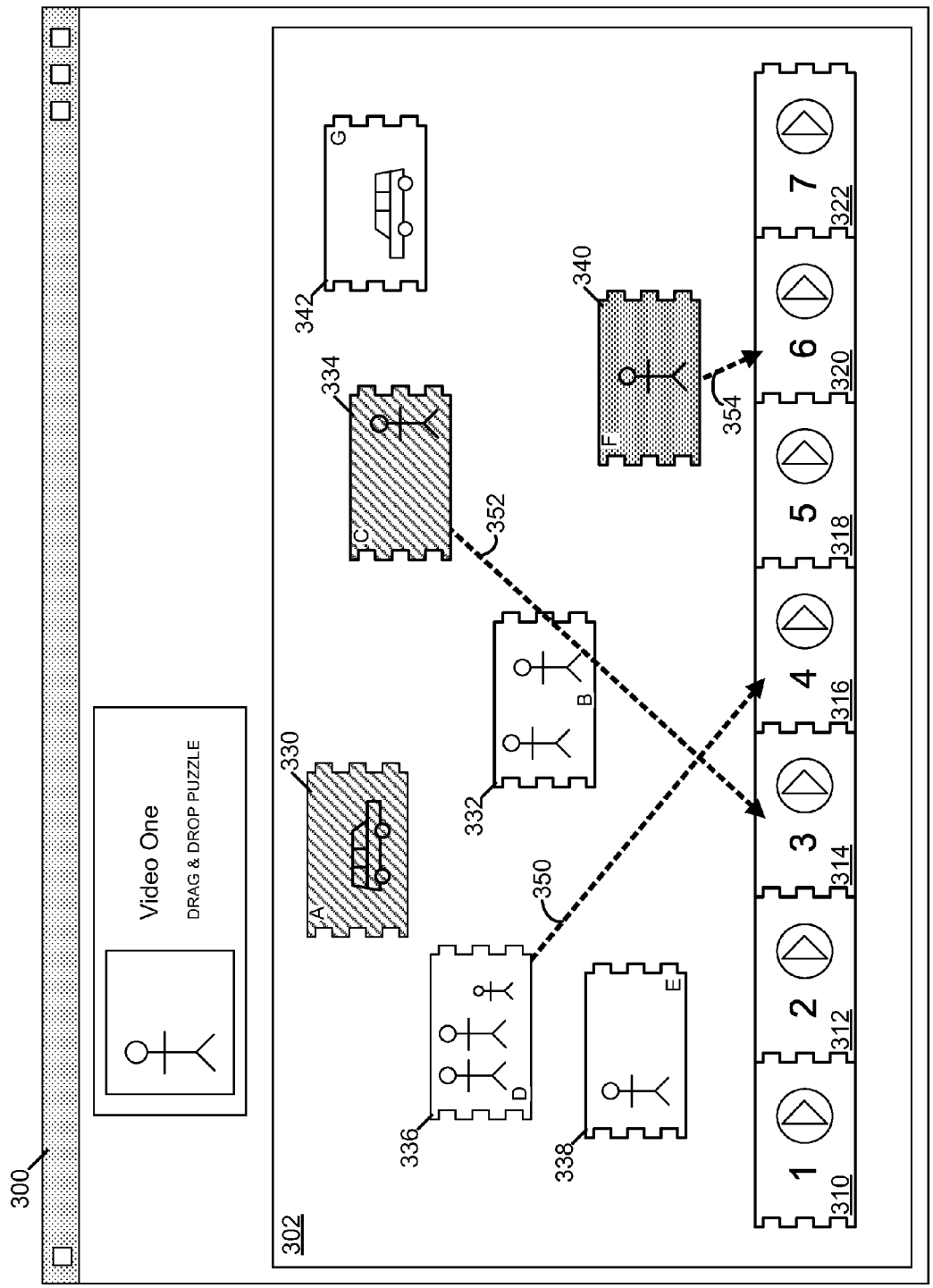

Referring now to FIGS. 3A-3D, FIGS. 3A-3D show a window 300 that is displayed by the video puzzle application for playing the Video One puzzle. The window 300 includes a video puzzle display area 302 that shows a number of icons that are used for playing the Video One Puzzle. In the puzzle of FIGS. 3A-3B, Video One has been divided into an ordered sequence of seven video data segments (referred to herein as "Video Data Segment A," "Video Data Segment B," "Video Data Segment C," and so on).

As shown in FIG. 3A, the video puzzle display area 302 includes seven randomly-placed video data segment icons 330, 332, 334, 336, 338, 340, 342, each of which corresponds to one of the video data segments from Video One, and each of which is shaped like a puzzle piece. The video data segment icons 330, 332, 334, 336, 338, 340, 342 include Video Data Segment Icon A 330, Video Data Segment Icon B 332, Video Data Segment Icon C 334, Video Data Segment Icon D 336, Video Data Segment Icon E 338, Video Data Segment Icon F 340, and Video Data Segment Icon G 342. Each video data segment icon 330, 332, 334, 336, 338, 340, 342 shown in FIGS. 3A-3D includes a letter for labeling purposes (e.g., "A," "B," "C," and so on). These letters are shown in FIGS. 3A-3D for the purpose of description, and would not actually be displayed in the window 300. In the video puzzle of FIGS. 3A-3D, Video Data Segment Icon A 330 corresponds to the first (i.e., earliest) video data segment in the ordered sequence (Video Data Segment A), Video Data Icon B 332 corresponds to the next video data segment in the sequence (Video Data Segment B), and so on, until Video Data Segment Icon G 342, which corresponds to the last video data segment (Video Data Segment G) in the sequence.

As shown in FIG. 3A, the video puzzle display area 302 includes a number of sequence position icons 310, 312, 314, 316, 318, 320, 322, each of which corresponds to a position in the ordered sequence of video data segments that make up Video One, and each of which is shaped like a puzzle piece. The sequence position icons 310, 312, 314, 316, 318, 320, 322 include Sequence Position Icon One 310, which corresponds to the first (i.e., earliest) position in the ordered sequence, Sequence Position Icon Two 312, which corresponds to the next position in the ordered sequence, and so on, until Sequence Position Icon Seven 322, which corresponds to the last position in the ordered sequence.

Further, each of the video data segment icons 330, 332, 334, 336, 338, 340, 342 includes an image from a frame within the video data segment to which the video data segment icon 330, 332, 334, 336, 338, 340, 342 corresponds. For example, Video Data Segment Icon A 330 (which corresponds to Video Data Segment A) includes an image that is one of the frames in Video Data Segment A, while the icon for Video Data Segment Icon B 332 includes an image that is one of the frames in Video Data Segment B, and so on.

Additionally, each of the sequence position icons 310, 312, 314, 316, 318, 320, 322 includes a play button. In response to a selection of a play button in one of the sequence position icons 310, 312, 314, 316, 318, 320, 322, the video puzzle application plays audio data from the video data segment that corresponds to the video data segment for the position in the sequence to which the selected sequence position icon 310, 312, 314, 316, 318, 320, 322 corresponds. For example, if the play button in Sequence Position Icon One 310 is selected, the video puzzle application will play audio from Video Data Segment A. Thus, the video puzzle application provides the user with audio clues as to where in the ordered sequence each of the video data segments belongs.

Referring now to FIGS. 4A-4C, FIGS. 4A-4C are conceptual diagrams that shows an example data structure 400 that the video puzzle application may store when the Video One puzzle is played. The data structure 400 includes a video data segment data item 402, a sequence position data item 406, and puzzle results data 404.

As shown in FIG. 4A, the video data segment data item 402 indicates correspondences between each of the video data segments in the ordered sequence to frames in the video, the video data segment icons (i.e., Video Data Segment Icon A 330, Video Data Segment B 332, and so on), and positions in the ordered sequence. For example, the first row in the video data segment data item 402 indicates that a first segment (labeled "Segment A") includes frames one through 100 in Video One, corresponds to Video Data Segment Icon A 330, and is in the first position (i.e., the earliest) in the ordered sequence.

The sequence position data item 406 indicates correspondences between sequence position icons 310, 312, 314, 316, 318, 320, 322 and positions in the ordered sequence. For example, the first row in the sequence position data item 406 indicates that Sequence Position Icon One 310 corresponds to the first position (i.e., earliest position) in the ordered sequence.

Referring again to FIG. 3A, to play the Video One puzzle, the user, using one or more input devices such as a mouse, keyboard, and/or touchscreen display, provides input to the video puzzle application that indicates which video data segments correspond to which positions in the ordered sequence. More specifically, the user provides this input by dragging and dropping the video data segment icons 330, 332, 334, 336, 338, 340, 342 onto the correct sequence position icons 310, 312, 314, 316, 318, 320, 322.

FIG. 3B shows a further view of the window of FIG. 3A. In the window of FIG. 3B, a number of arrows run from video data segment icons to sequence position icons. These arrows are not actually displayed within the window 300 of FIG. 3B itself, but are shown in FIG. 3B to illustrate drag and drop paths that a user may use to indicate which video data segments correspond to which sequence positions within Video One. FIG. 3B shows drag and drop operations from Video Data Segment Icon C 336 to Sequence Position Icon Three 314, from Video Data Segment Icon D 336 to Sequence Position Icon Four 316, and from Video Data Segment Icon F 340 to Sequence Position Icon Six 320.

When the user performs a drag and drop operation from a source video data segment icon 330, 332, 334, 336, 338, 340, 342 to a target sequence position icon 310, 312, 314, 316, 318, 320, 322, the video puzzle application analyzes whether the drag and drop operation indicates a correct position for the video data segment to which the source video data segment icon 330, 332, 334, 336, 338, 340, 342 corresponds. For example, if a drag and drop operation indicates that Video Data Segment Icon C 336 has been dropped onto Sequence Position Icon Three 314, the video puzzle application determines whether the position for the video data segment to which Video Data Segment Icon C 336 corresponds (in this example, the third position in the ordered sequence) is the same as the position in the sequence to which Video Data Segment Icon C 336 (in this example, the third position in the ordered sequence). In the example, the two positions (i.e., the position of Video Data Segment C and the position to which Video Data Segment Icon C 336 corresponds) are the same. As such, the user has indicated a correct position for the involved video data segment (i.e., Video Data Segment C).

The video puzzle application may analyze whether a drag and drop operation correctly indicates a position for a video data segment using, for example, using the data structure 400 of FIGS. 4A-4C (which includes data items such as the video data segment data item 402 and the sequence position data item 406), and/or any other appropriate data structure. Alternatively or additionally, when the video puzzle application uses a data item such as the puzzle results data 404 shown in FIGS. 4A-4C, when the video puzzle application determines that a drag and drop operation indicates a correct position for the involved video data segment, the video puzzle application may update the puzzle results data 404 accordingly.

Figure 3C:
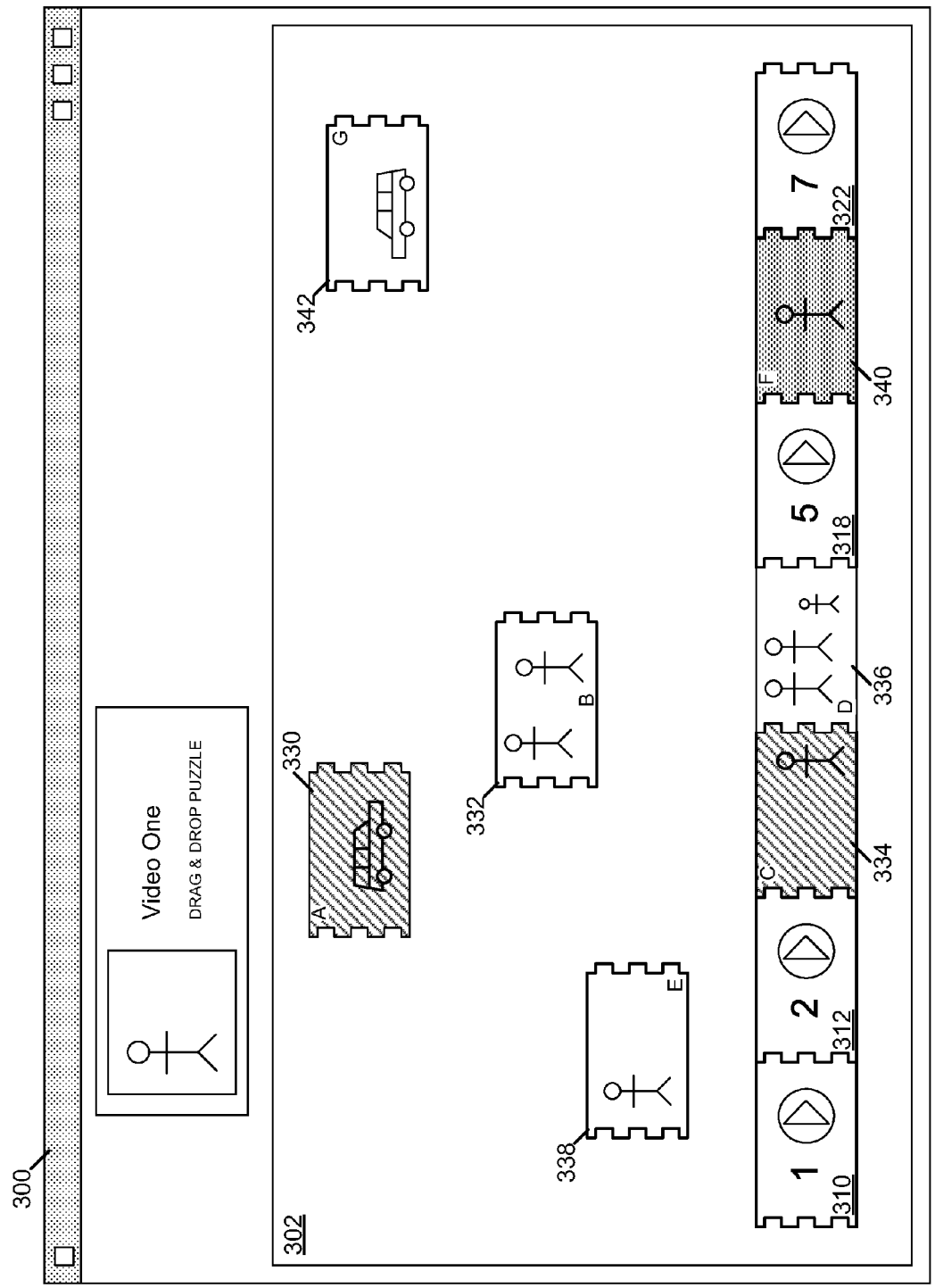

Referring now to FIG. 3C, FIG. 3C shows how the window 300 of FIGS. 3A-3D appears, after the drag/drop operations illustrated in FIG. 3B are performed. As shown in FIG. 3C, after a correct drag/drop operation is performed, the video puzzle application sets the correctly placed video data segment icons 330, 332, 334, 336, 338, 340, 342 to be fixed above their corresponding (correct) sequence position icons 310, 312, 314, 316, 318, 320, 322, and the video data segment icons 330, 332, 334, 336, 338, 340, 342 become not movable (i.e., are not moved by the video puzzle application in response to user input).

Referring now to FIG. 4B, FIG. 4B shows how the puzzle results data 404 would be updated by the video puzzle application, after the drag/drop operations illustrated in FIG. 3B are performed. In other words, FIG. 4B shows the state of the puzzle results data 404 when the window 300 of FIGS. 3A-3D appears as it does in FIG. 3C. As mentioned above, FIG. 3B shows drag and drop operations that involve Video Data Segment C, Video Data Segment D, and Video Data Segment F. Accordingly, the rows in the puzzle results data 404 as shown in FIG. 4B that corresponds to Video Data Segment C, Video Data Segment D, and Video Data Segment F indicate that the orders for these segments in the ordered sequence have been correctly indicated by the user.

As the video puzzle application receives drag and drop operations, the video puzzle application determines whether the video puzzle has been solved based on whether the user has correctly indicated the positions in the ordered sequence for all of the video data sequences in Video One. Again referring to the puzzle results data 404 shown in FIG. 4A, when the video puzzle application receives a correct drag and drop operation and updates the puzzle results data 404, the video puzzle application may also analyze whether the updated results data 404 indicates that the positions for all of the video data segments in Video One have been indicated. If so, the video puzzle application determines that the Video One puzzle has been solved.

Figure 3D:
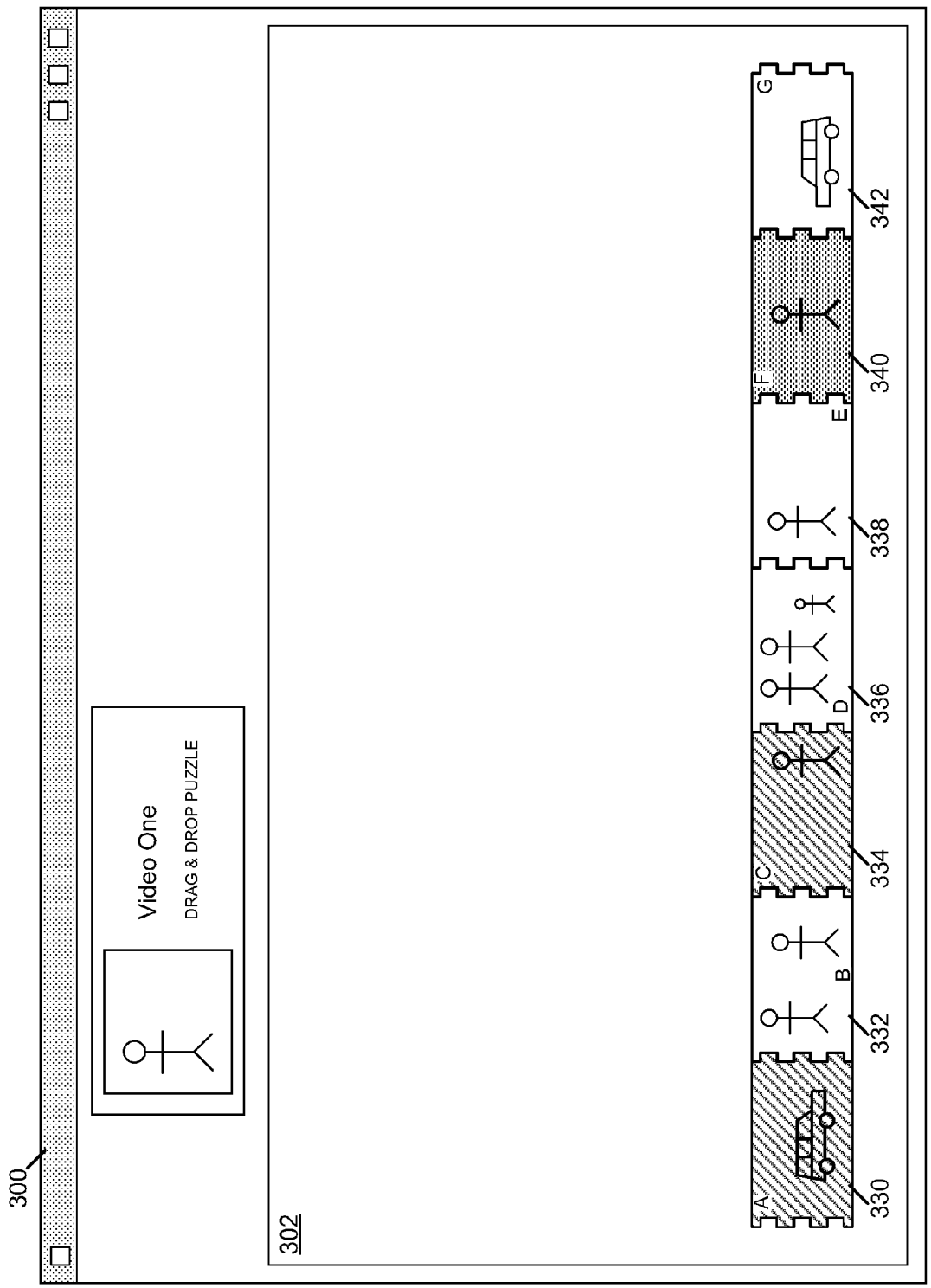

Referring now to FIG. 3D, FIG. 3D shows how the window 300 of FIGS. 3A-3D appears, once the necessary drag/drop operations have been performed, and the user has solved the puzzle. In other words, FIG. 3D shows that all of the video data segment icons have become fixed above their corresponding (correct) sequence position icons. Similarly, FIG. 4C shows how the puzzle results data 404 would be updated by the video puzzle application after the user has solved the puzzle.

It should be noted that data structure 400 shown in FIGS. 4A-4C is provided by way of example, and the video puzzle application may implement the functionality described herein using any appropriate data structure and/or arrangement of data.

Referring now to FIGS. 5A-5D, FIGS. 5A-3D show a window 500 that is displayed by the video puzzle application for playing the Video Two puzzle. The window 500 includes a video puzzle display area 502 that shows a number of icons that are used for playing the Video Two puzzle, as well as a frame display area 550. In the Video Two puzzle, Video Two has been divided into an ordered sequence of seven video data segments ("Video Data Segment A, Video Data Segment B, Video Data Segment C, and so on).

Figure 5A:
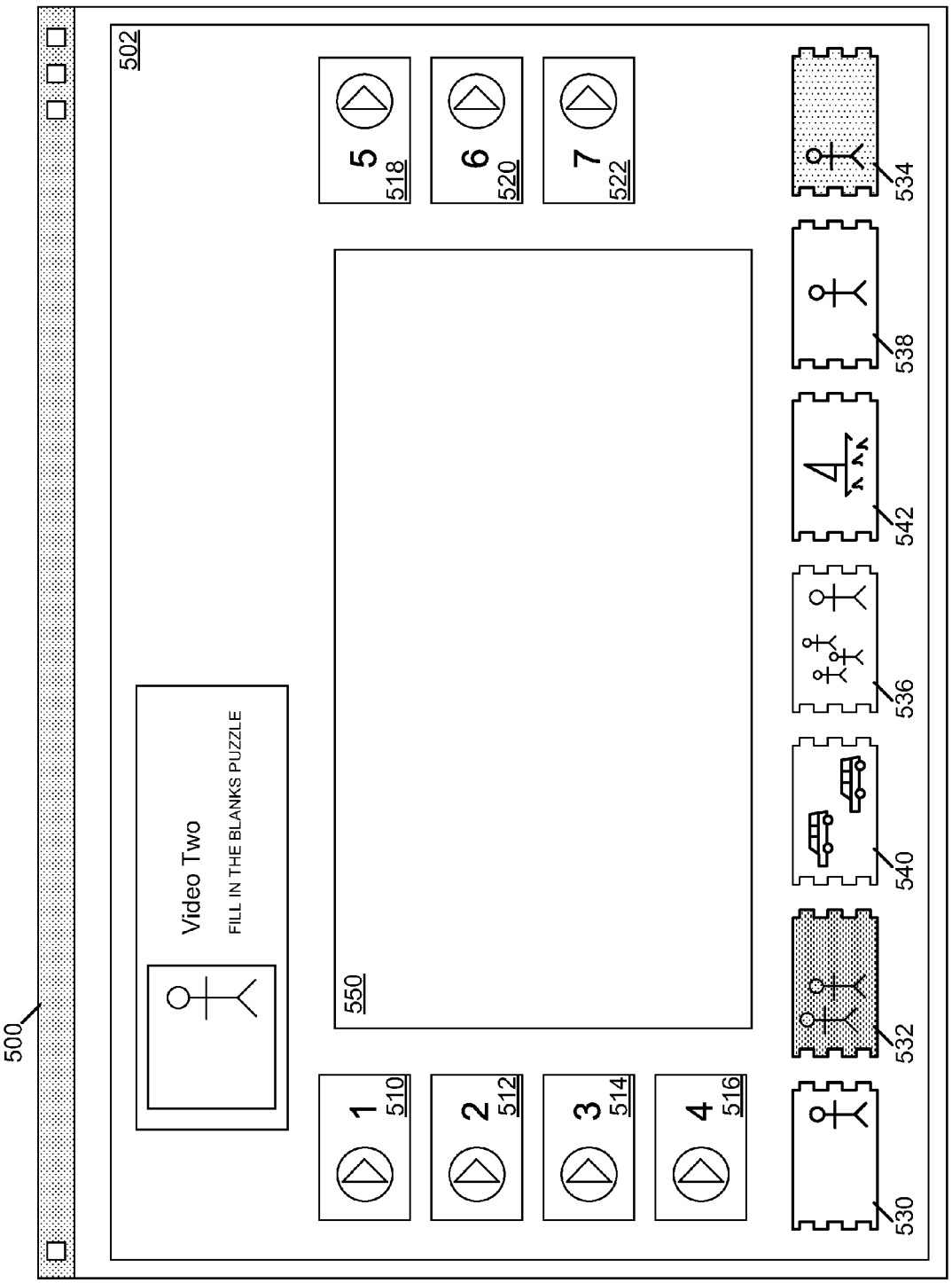
FIGS. 5A-5C show a window that is displayed by the video puzzle application for a second type of video puzzle.

As shown in FIG. 5A, the video puzzle display area 502 includes seven video data segment icons 530, 532, 534, 536, 538, 540, 542, each of which corresponds to one of the video data segments from Video Two, and each of which is shaped like a puzzle piece. The video data segment icons 530, 532, 534, 536, 538, 540, 542 include Video Data Segment Icon A 530, Video Data Segment Icon B 532, Video Data Segment Icon C 534, Video Data Segment Icon D 536, Video Data Segment Icon E 538, Video Data Segment Icon F 540, and Video Data Segment Icon G 542. In the video puzzle of FIGS. 5A-5C, Video Data Segment Icon A 530 corresponds to the first (i.e., earliest) video data segment in the ordered sequence (Video Data Segment A), Video Data Icon B 532 corresponds to the next video data segment in the sequence (Video Data Segment B), and so on, until Video Data Segment Icon G 542, which corresponds to the last video data segment (Video Data Segment G) in the sequence. Each of the video data segment icons 530, 532, 534, 536, 538, 540, 542 includes an image from a frame within the video data segment to which the video data segment icon 530, 532, 534, 536, 538, 540, 542 corresponds. For example, Video Data Segment Icon A 530 (which corresponds to Video Data Segment A) includes an image that is one of the frames in Video Data Segment A, while the icon for Video Data Segment Icon B 532 includes an image that is one of the frames in Video Data Segment B, and so on.

Also as shown in FIG. 5A, the video puzzle display area 502 includes a number of sequence position icons 510, 512, 514, 516, 518, 520, 522, each of which corresponds to a position in the ordered sequence of video data segments that make up Video Two, and each of which is shaped like a puzzle piece. The sequence position icons 510, 512, 514, 516, 518, 520, 522 include Sequence Position Icon One 510, which corresponds to the first (i.e., earliest) position in the ordered sequence, Sequence Position Icon Two 512, which corresponds to the next position in the ordered sequence, and so on, until Sequence Position Icon Seven 522, which corresponds to the last position in the ordered sequence. Each of the sequence position icons 510, 512, 514, 516, 518, 520, 522 includes a play button. In response to a selection of a play button in one of the sequence position icons 510, 512, 514,

516, 518, 520, 522, the video puzzle application plays audio data from the video data segment that corresponds to the video data segment for the position in the sequence to which the selected sequence position icon 510, 512, 514, 516, 518, 520, 522 corresponds. For example, if the play button in Sequence Position Icon One 510 is selected, the video puzzle application will play audio from Video Data Segment A. Thus, the video puzzle application provides the user with audio clues as to where in the ordered sequence each of the video data segments belongs.

To play the Video Two puzzle, the user begins by selecting one of the video data segment icons 530, 532, 534, 536, 538, 540, 542. In response to a selection of one of the video data segment icons, the video puzzle application updates the frame display area 550 in the window 500, such that the frame display area 550 (which is shown as empty in FIG. 5A) displays a larger version of the image that is included in the selected video data segment icon 530, 532, 534, 536, 538, 540, 542. An example of this is shown in FIG. 5B.

Figure 5B:
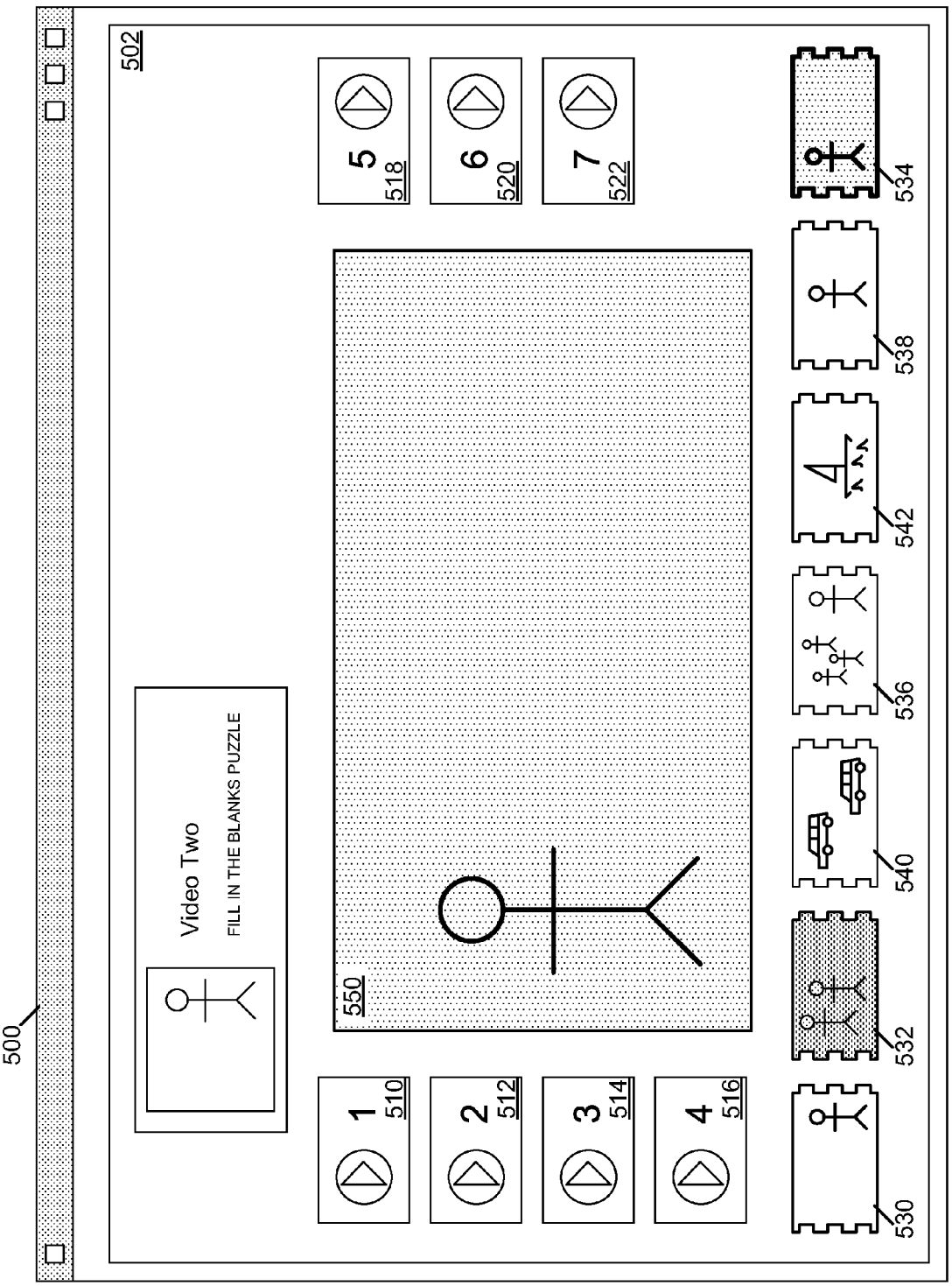
Figure 5C:
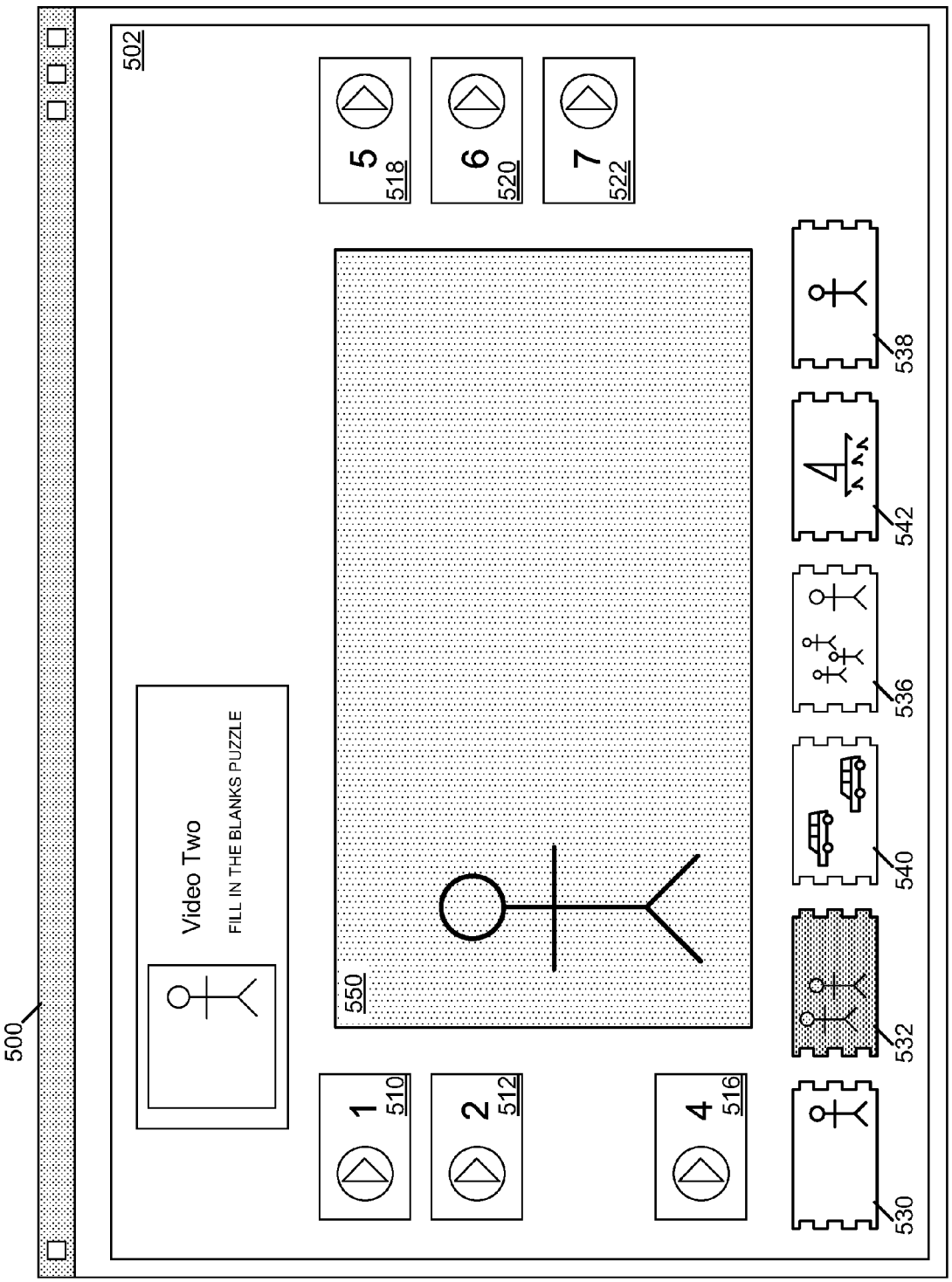

Specifically, FIG. 5B shows an example of how the window of FIGS. 5A-5C appears when Video Data Segment Icon C 534 is selected. In FIG. 5B, a larger version of the frame shown in Video Data Segment Icon C 534 is displayed in frame display area 550. Also as shown in FIG. 5B, the outline of Video Data Segment Icon C 534 is displayed thicker, to indicate that Video Data Segment Icon C 534 is selected.

After selecting a video data segment icon 530, 532, 534, 536, 538, 540, 542, the user then selects the sequence position icon 510, 512, 514, 516, 518, 520, 522 that the user believes corresponds to the selected video data segment icon. As one example, if the user believes that the video data segment that corresponds to Video Data Segment Icon C 534 is the third video data segment in the sequence, the user selects Video Data Segment Icon C 534, and then selects Sequence Position Icon Three 514.

FIG. 5C shows an example of how the window of FIGS. 5A-5C appears when the user has correctly indicated a correspondence between a video data segment and a sequence position in Video Two. In this example, the user has correctly indicated that Video Data Segment Icon C 534 is in the third position in the sequence of video data sequences in Video Two by selecting Video Data Segment Icon C 534 and then selecting Sequence Position Icon Three 514. As shown in FIG. 5C, Video Data Segment Icon C 534 and Sequence Position Icon Three 514 have been removed from the video puzzle display area 502. The removal of these two icons indicates that the user has indicated the correct position for the video data segment that corresponds to Video Data Segment Icon C 534.

As a variation on what is shown in FIG. 5C, the video puzzle application may, instead of removing icons, change how icons for solved portions of the puzzle are displayed. For example, the video puzzle application may indicate that the correct position for a video data segment has been indicated by the user by displaying video data segment icons 530, 532, 534, 536, 538, 540, 542 using a grayed-out appearance, a semi-transparent appearance, or some other approach, to indicate that those video data segment icons 530, 532, 534, 536, 538, 540, 542 are no longer active.

To finish the puzzle shown in FIGS. 5A-5C, the user may select video data segment icons 530, 532, 534, 536, 538, 540, 542 and corresponding sequence position icons 510, 512, 514, 516, 518, 520, 522 in the same or a similar fashion as that described above, until the user has indicated the correct positions in the sequence for all of the video data segments.

As the user plays the Video Two puzzle, the video puzzle application may store and/or update a data structure that is similar or analogous to the data structure 400 described above with reference to FIGS. 3A-3D and FIGS. 4A-4C, modified, mutatis mutandis, for use with the Video Two puzzle. For example, the vide puzzle application may store and/or update puzzle results data with similar or identical characteristics to the puzzle results data 404 described above with reference to FIGS. 3A-3D and FIGS. 4A-4C. Alternatively or additionally, as the user plays the Video Two puzzle, the video puzzle application may perform similar or analogous processing as that described above with reference to FIGS. 3A-3D for determining whether the user has correctly indicated a position in the sequence for a video data segment, modified, mutatis mutandis, for use with the Video Two puzzle.

Figure 6A:
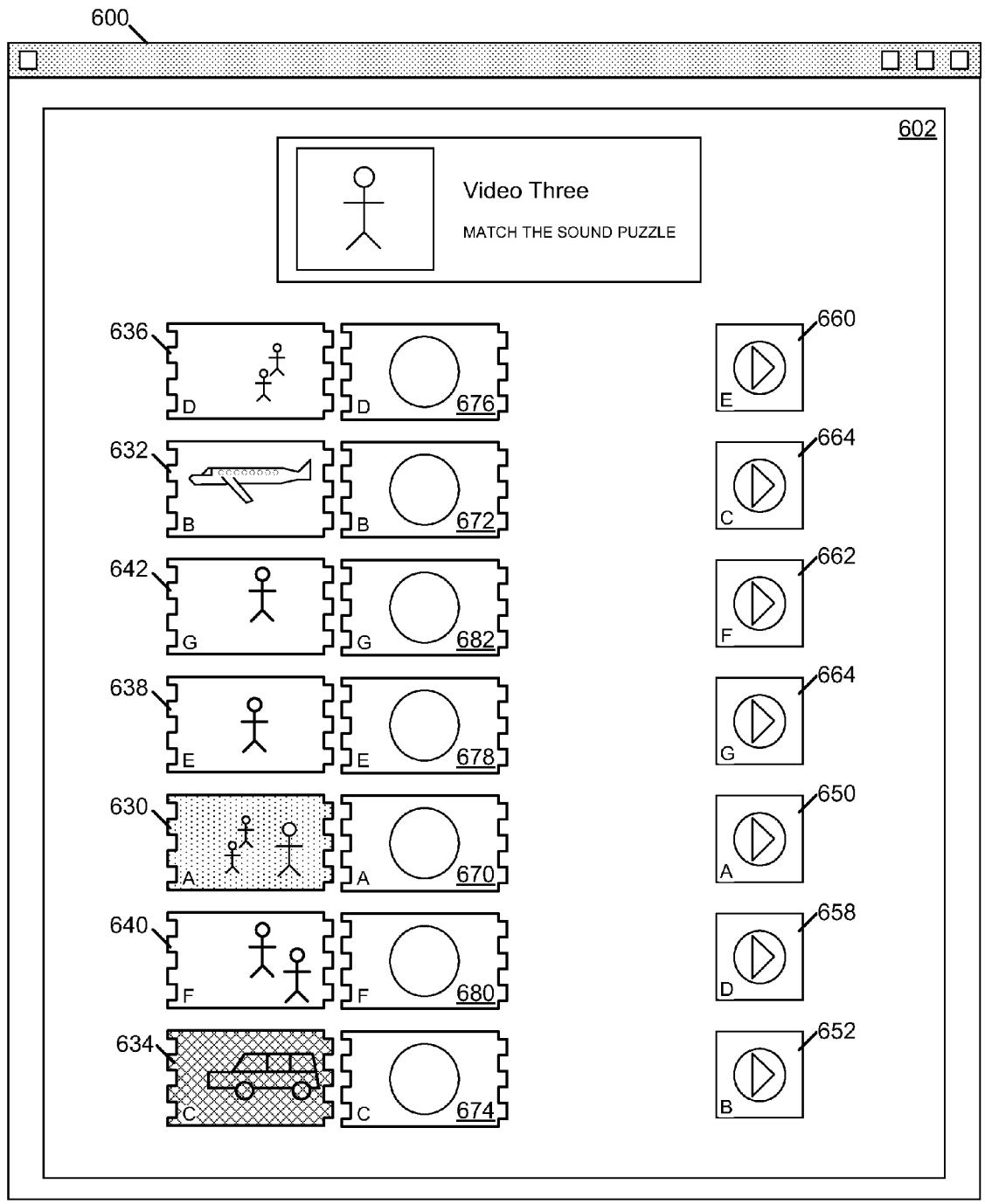
FIGS. 6A-6C show a window that is displayed by the video puzzle application for a third type of video puzzle.
Figure 6B:
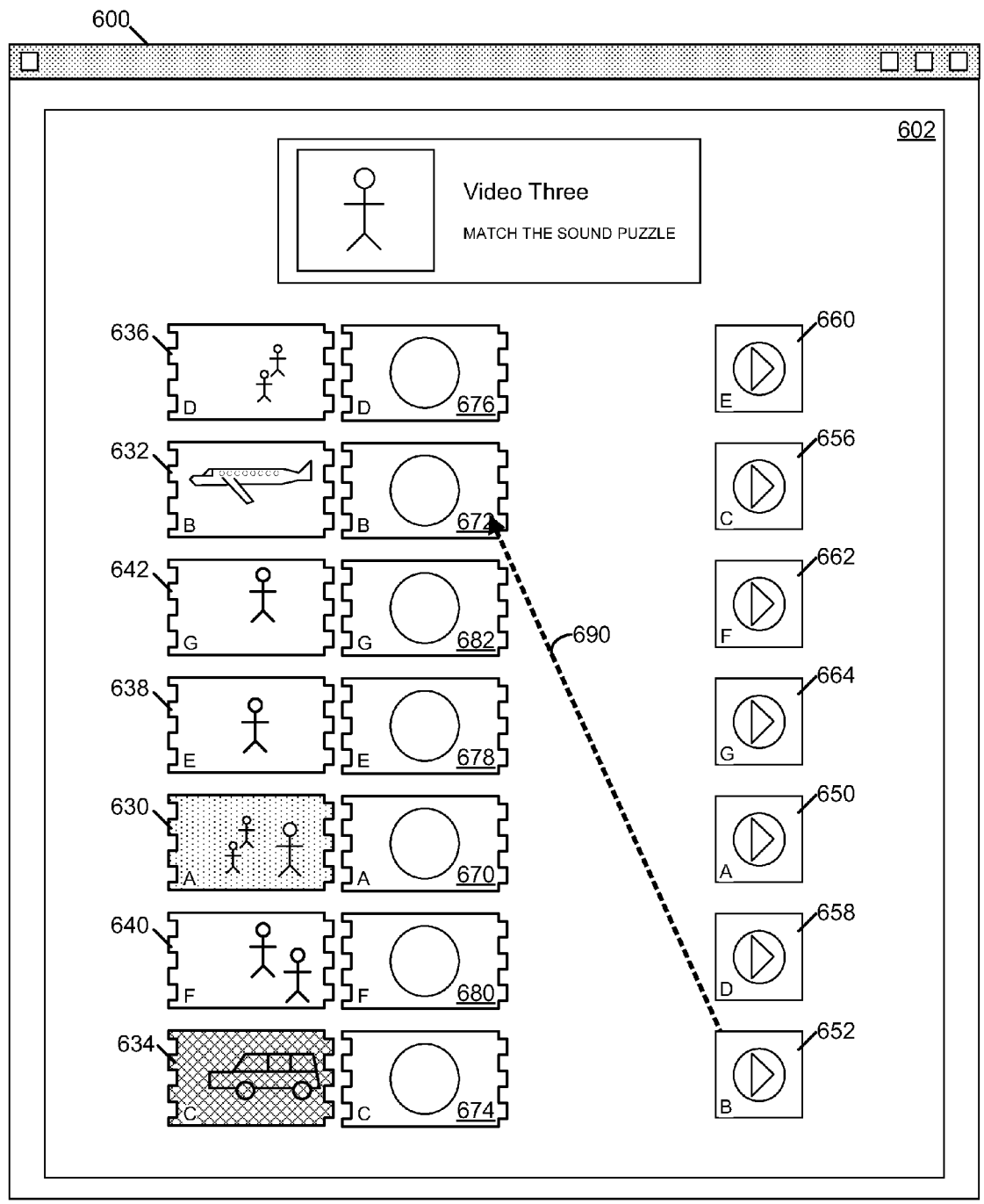
Figure 6C:
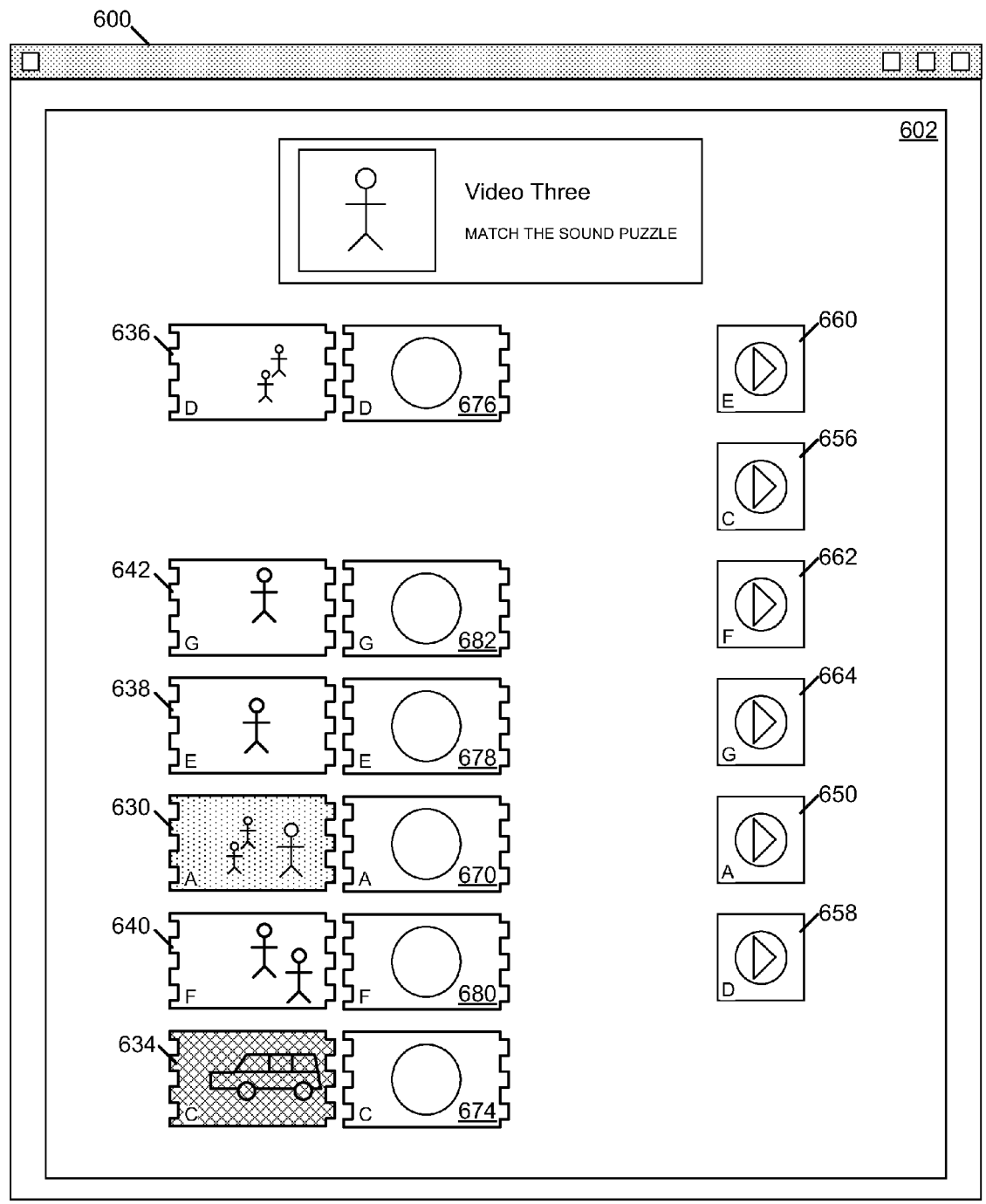

FIGS. 6A-6C show a window 600 that is displayed by the video puzzle application for playing the Video Three puzzle. The window 600 includes a video puzzle display area 602 that shows a number of icons that are used for playing the Video Three Puzzle. In the Video Three puzzle, Video Three has been divided into seven video data segments (Video Data Segment A, Video Data Segment B, Video Data Segment C, and so on).

As shown in FIG. 6A, the video puzzle display area 602 includes a number of video segment data icons 630, 632, 634, 636, 638, 640, 642. The video puzzle display also includes a number of drag/drop target icons 670, 672, 674, 676, 678, 680, 682 and a number of audio icons 650, 652, 654, 656, 658, 660, 662.

Each of the audio icons 650, 652, 654, 656, 658, 660, 662 are associated with one of the video data segments into which Video Three is divided. Each of the audio icons includes a letter for labeling purposes (e.g., "A," "B," "C," and so on). These letters are shown in FIGS. 6A-6C for the purpose of description, and would not actually be displayed in the window 600 shown in FIGS. 6A-6C. In the puzzle of FIGS. 6A-6C, the audio icon labeled "A" corresponds to the video data segment for the first sequence position in Video Three, the audio icon labeled "B" corresponds to the video data segment for the second sequence position in Video Three, and so on. Each of the audio icons 650, 652, 654, 656, 658, 660, 662 includes a play button. In response to a selection of one of the play buttons, the video puzzle application plays audio data from the video data segment to which the selected audio icon 650, 652, 654, 656, 658, 660, 662 corresponds.

Each of the video data segment icons 630, 632, 634, 636, 638, 640, 642 in the window of FIGS. 6A-6C also corresponds to one of the video data segments from Video Three. Additionally, each of the video data segment icons 630, 632, 634, 636, 638, 640, 642 is associated with the drag/drop target icon 670, 672, 674, 676, 678, 680, 682 that is in the same row as the video data segment icon (i.e., Video Data Segment Icon A 630 is associated with Drag/Drop Target Icon A 670, and so on). As with the audio icons, each of the video data segment icons and drag/drop target icons include a letter for labeling purposes (e.g., "A," "B," "C," and so on) that indicate which video data segment they are associated with. Also as with the audio icons, these letters are used herein for the purpose of description, and would not actually be displayed in the window shown in FIGS. 6A-6C.

Each of the video data segment icons 630, 632, 634, 636, 638, 640, 642 includes an image from a frame within the video data segment to which the video data segment icon 630, 632, 634, 636, 638, 640, 642 corresponds. Alternatively or additionally, while the window 600 of FIGS. 6A-6C is being displayed, each of the video data segment icons 630, 632, 634, 636, 638, 640, 642 may cycle through different frames within the video data segment with which they are associated. As an example of this, a video data segment icon may show a first frame (frame N) from its corresponding video data segment, then show frame N+160, then show frame N+300, and then show frame N+460, and so on, changing between the frames periodically. If the video data segment icon reaches the limit of its corresponding video data segment, the icon may then start the cycle over again at frame N.

The video puzzle application may determine the initial layout for the window of FIGS. 6A-6C (i.e., which rows will include icons associated with which video data segments) on a random basis, prior to displaying the window 600.

To play the Video Three puzzle, the user provides input to the video puzzle application that indicates correspondences between the audio icons 650, 652, 654, 656, 658, 660, 662 and the video data segment icons 630, 632, 634, 636, 638, 640, 642. More specifically, the user provides this input by dragging audio icons 650, 652, 654, 656, 658, 660, 662 that correspond to a video data segment onto the drag/drop target icons 670, 672, 674, 676, 678, 680, 682 that correspond to same video data segments.

FIG. 6B shows a further view of the window 600 of FIG. 6A. In the window 600 as shown in FIG. 6B, an arrow 690 runs from the Audio Icon B 652 to Drag/Drop Target Icon B 672. This arrow 690 would not actually displayed within the window of FIG. 6B itself, but is shown in FIG. 6B to illustrate a drag and drop path that a user may use to indicate the correspondence between Audio Icon B 652 to Video Data Segment Icon B 632.

FIG. 6C shows how the window 600 shown in FIGS. 6A-6B appears, after the drag/drop operation illustrated in FIG. 6B is performed. In this example, the user has correctly indicated a correspondence between Audio Icon B 652 to Video Data Segment Icon B 632. As shown in FIG. 6C, Audio Icon B 652, Video Data Segment Icon B 632, and Drop/Drag Target Icon B 672 have been removed. The removal of these icons 632, 652, 672 indicates that this portion of the puzzle (i.e., the question of which video data segment corresponds to the second position in the sequence of Video Three) has been correctly solved. As a variation on what is shown in FIG. 6C, the video puzzle application may, instead of removing icons, change how icons for solved portions of the puzzle are displayed. For example, the video puzzle application may display icons for solved portions of the puzzle using a grayed-out appearance, a semi-transparent appearance, or some other approach to indicate that those icons are no longer active.

To finish the puzzle shown in FIGS. 6A-6C, the user may drag and drop audio icons 650, 652, 654, 656, 658, 660, 662 onto the correct drag/drop target icons 670, 672, 674, 676, 678, 680, 682 in the same or a similar fashion as that described above, until the puzzle is complete.

As the user plays the Video Three puzzle, the video puzzle application may store and/or update a data structure that is similar or analogous to the data structure 400 described above with reference to FIGS. 3A-3D and FIGS. 4A-4C, modified, mutatis mutandis, for use with the Video Three puzzle. For example, the video puzzle application may store and/or update puzzle results data with similar characteristics to the puzzle results data 404 described above with reference to FIGS. 3A-3D and FIGS. 4A-4C. Alternatively or additionally, as the user plays the Video Three puzzle, the video puzzle application may perform similar or analogous processing as that described above with reference to FIGS. 3A-3D for determining whether the user has correctly indicated a position in the sequence for a video data segment, modified, mutatis mutandis, for use with the Video Three puzzle.

When each or any of the puzzles described above in FIGS. 3A-6C are successfully completed, the video puzzle application may display a pop up window congratulating the user on their success, return the user to the main window 100 shown in FIG. 1, and/or perform one or more other actions.

A number of examples are provided above with reference to FIGS. 3A-6C wherein a user successfully completes a portion of a puzzle (e.g., with respect to the Video Three puzzle, dragging an audio icon onto the correct video data segment icon). It may also occur that a user makes errors while playing the above-described puzzles (e.g., drags an audio icon onto an incorrect video data segment icon). The video puzzle application may handle errors in a number of different ways. For example, when the user make an error, the video puzzle application may perform one or more of: displaying a pop up window that indicates an error was made; playing an alert message that indicates an error was made; changing the appearance of the window on which the error was made; and/or performing one or more other actions. Further, the video puzzle application may keep track of how many errors the user has made, and may end the play of a puzzle (i.e., make the user start over) if an error threshold is reached.

As mentioned above with reference to FIG. 1, the video puzzle application may display a preview window (such as the window 200 of FIG. 2) when the Play button 130 in the main window 100 of FIG. 1) is selected. The video puzzle application may also display similar windows when the other Play buttons 132, 134 are selected. Alternatively, the video puzzle application may be configured to proceed directly to a puzzle (i.e., to directly display the windows 300, 500, 600 described above with reference to FIGS. 3A-6C, thereby skipping the preview window 200 of FIG. 2) in response to selection of the Play buttons 130, 132, 134 shown in FIG. 1.

When the Create button 104 in the main window 100 of FIG. 1 is selected, the video puzzle application displays a window that may be used for creating a new video puzzle. The window may include buttons, drop down boxes, input boxes, and other user interface artifacts, via which the user may input information such as: a name of the video puzzle; a category associated with the puzzle; the type of the puzzle; a background image to use for the puzzle; where the video that is the input puzzle may be found (e.g., a web address for the video, or where a video file may be found on a local hard drive or other data storage device); and/or other information. After the video puzzle application receives this information, the video puzzle application creates the video puzzle. After the video puzzle is created, the user may use the video puzzle application to upload the video puzzle to a social networking site or other type of web site, such as Facebook, YouTube, or any other web site. Alternatively or additionally, after the video puzzle is created, the user may use the video puzzle application to save the created video puzzle to a local hard drive or other data storage device.

When the Browse button 102 in the main window 100 of FIG. 1 is selected, the video puzzle application displays a window that permits the user to search on the Internet for other video puzzles that have been created using the video puzzle application.

When the Saved button 106 in the main window 100 of FIG. 1 is selected, the video puzzle application displays a window that may be used to browse puzzles that are saved on a local hard drive or other data storage device, and to load the puzzles into the video puzzle application for play. Similarly, when the "Share" button is selected, the video puzzle application displays a window that may be used by the user to upload video puzzles that the user has created to a social networking site or other type of web site, such as Facebook, YouTube, or any other web site. Alternatively or additionally, the window displayed by the video puzzle application may be used to email a video puzzle or a hyperlink to a video puzzle to another user.

Although a number of examples are provided above wherein videos are divided into seven segments, the number seven was chosen purely by way of example. The video puzzle application described herein may operate with videos that are divided into any number of video data segments. Additionally, the video data segments may be of any duration.

The videos that may be used with the video puzzle application include videos any type of content. For example, videos that may be used with the video puzzle application include music videos, full feature-length films, documentary videos, commercial videos, homemade/amateur videos, and/or other types of videos.

The video puzzle application described herein may be used with video of any type of format. For example, the video puzzle application may be used with videos that are formatted according to formats such as but not limited to: H.264 (MPEG); H.263; H.262Windows Media Video (WMV); Quicktime; and/or any other appropriate format.

The video puzzle application described herein may be implemented as a stand-alone executable, as a web application, as a rich Internet application, and/or as any other appropriate type of application. The video puzzle application may be implemented using technologies that include modern programming languages such as C and/or C++, a development framework such as Adobe Air, and/or any other appropriate technology.

Figure 7:
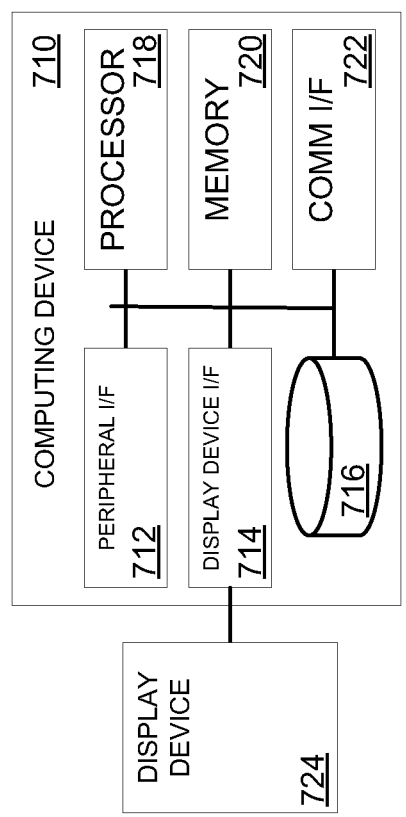
FIG. 7 shows an example computing device that may be configured to perform features described herein.

FIG. 7 shows an example computing device 710 that may be used to implement features described herein. The computing device 710 may be a desktop computer, a laptop computer, a cellular phone, a tablet computer, or any other appropriate type of computing device 710 or data processing device. The computing includes a processor 718, memory device 720, communication interface 722, input device interface 712, display device interface 714, and data storage device 716. FIG. 7 also shows a display device 724, which may be coupled to or included within the computing device 710.

The memory device 720 may be or include a device such as a Dynamic Random Access Memory (D-RAM), Static RAM (S-RAM), or other RAM or a flash memory. The data storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

The input device interface 712 is configured to communicate with one or more input devices. The input device interface 712 operates using a technology such as Universal Serial Bus (USB), PS/2, Bluetooth, infrared, serial port, parallel port, and/or other appropriate technology. The input device interface 712 may, for example, receive input data from an input device such as a keyboard, a mouse, a trackball, a touch screen, a touch pad, a stylus pad, and/or other device.

The display device interface 714 may be an interface configured to communicate data to the display device 724. The display device 724 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the display device 724 for display by the display device 724.

Although not shown in FIG. 7, the computing device 710 may include or be coupled to one or more audio devices, such as speakers or other similar devices. The computing device 710 may communicate with the one or more audio devices via an audio device interface (also not depicted in FIG. 7) that is included in the computing device 710. In some instances (for example, when the computing device 710 includes an HDMI interface, which handles both audio and video data), the audio device interface may be included within or coupled to the display device interface 714.

The memory device 720 and/or the data storage device 716 in the computing device 710 of FIG. 7 may store instructions which, when executed by the processor 718, cause the processor 718 to perform any feature or any combination of features described above as performed by the video puzzle application.

Alternatively or additionally, each or any of the features described herein as performed by the video puzzle application may be performed by the processor 718 in conjunction with the memory device 720, communication interface 722, input device interface 712, display device interface 714, audio device interface, and/or storage device. As one example, any or any combination of the information described herein as displayed or output in an audio format by the video puzzle application may be displayed/output by the processor 718 in conjunction with the display device interface 714 and/or the audio device interface. Alternatively or additionally, any or any combination of the information described above as processed by the video puzzle application may be processed by the processor 718 and stored in the memory device 720 and/or the storage device. Alternatively or additionally, any or any combination of the information described herein as communicated over a network by the video puzzle application may be communicated over a network by the processor 718 in conjunction with the communication interface 722.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described above with reference to FIGS. 1-7 may be used alone without the other features and elements or in various combinations with or without other features and elements. Sub-elements of the methods and features described above with reference to FIGS. 1-7 may be performed in any arbitrary order (including concurrently), in any combination or sub-combination.

What is claimed is:

1. A non-transitory computer-readable medium having processor-executable instructions stored thereon which, when executed by at least one processor, will cause the at least one processor to perform a method for displaying a video puzzle and determining whether the video puzzle has been solved based on input from a user, the method comprising:
storing video data in a memory device, wherein the video data includes:
a plurality of video data segments that make up a video, wherein each of the video data segments includes a plurality of frames and corresponding audio data;
data that indicates an ordered sequence of the video data segments in the video, wherein each of the video data segments has a position in the sequence;
storing puzzle results data in the memory device, wherein the puzzle results data indicates, for each of the video data segments, whether the user has correctly indicated the position of the video data segments in the sequence;
displaying, via a display device, a video puzzle display area, wherein the video puzzle display area includes:
a plurality of video data segment icons,
wherein each of the video data segment icons corresponds to a video data segment of the video data segments, and
wherein each of the video data segment icons includes a frame from the video data segment to which the video data segment icon corresponds; and
a plurality of sequence position icons, wherein each of the sequence position icons corresponds to a position in the sequence;
receiving user input data from the user via an input device, wherein the user input data includes a plurality of drag and drop operations,
wherein each of the drag and drop operations indicates a drag and drop operation from a source video data segment icon of the video data segment icons onto a target sequence position icon of the sequence position icons;
for each of the drag and drop operations,
determining whether the position in the sequence of the video data segment to which the source video data segment icon corresponds is the same as the position in the sequence to which the target sequence position icon corresponds, and
when the position in the sequence of the video data segment to which the source video data segment icon corresponds is the same as the position in the sequence to which the target sequence position icon corresponds, updating the puzzle results data to indicate that the user has correctly indicated the position in the sequence of the video data segment to which the source video data segment icon corresponds; and
determining that the video puzzle has been solved when the puzzle results data indicates that the user has correctly indicated the positions in the sequence of all of the video data segments.

2. The computer-readable medium of claim 1, wherein the method further comprises:
displaying, via the display device, information that indicates that the video puzzle has been solved.

3. The computer-readable medium of claim 1, wherein the method further comprises:
receiving a second user input data that indicates that a video data segment icon of the video data segment icons has been selected; and
in response to the second user input data, playing an audio clue via an audio device, wherein the audio clue includes audio data from the video data segment that has the position in the sequence that is the same as the position in the sequence to which the selected video data segment icon corresponds.

4. The computer-readable medium of claim 1, wherein the video is a music video.

5. The computer-readable medium of claim 1, wherein the video is a feature-length film, a documentary video, or a commercial video.

6. A method for displaying a video puzzle and determining whether the video puzzle has been solved based on input from a user, the method comprising:
storing, in a memory device, data that represents a plurality of video data segments that make up a video and data that indicates an ordered sequence of the video data segments in the video;
storing, in the memory device, puzzle results data that indicates whether the user has correctly indicated the positions of the video data segments in the sequence;
a processor displaying, via a display device, a video puzzle display area that includes information related to the video puzzle;
the processor receiving user input data from the user via an input device, wherein the user input data indicates positions of the video data segments in the sequence;
the processor updating the puzzle results data based on the data that indicates the sequence of the video data segments in the video and the user input data; and the processor determining that the video puzzle has been solved when the puzzle results data indicates that the user has correctly indicated the positions in the sequence of all of the video data segments.

7. The method of claim 6, wherein the method further comprises:
displaying, via the display device, information that indicates that the video puzzle has been solved.

8. The method of claim 6, wherein the video is a music video.

9. The method of claim 6, wherein the video is a feature-length film, a documentary video, or a commercial video.

10. The method of claim 6, further comprising:
displaying a plurality of video data segment icons and a plurality of sequence positions icons in the video puzzle display area,
wherein each of the video data segment icons corresponds to a video data segment of the video data segments,
wherein each of the sequence position icons corresponds to a position in the sequence, and
wherein the user input data includes drag and drop operations from the video data segment icons to the sequence position icons; and
receiving a second user input data that indicates that a video data segment icon of the video data segment icons has been selected; and
in response to the second user input data, playing an audio clue for solving the video puzzle via an audio device.

11. The method of claim 10,
wherein each of the video data segments includes a plurality of frames, and wherein each of the video data segment icons includes at least one frame from the video data segment to which the video data segment icon corresponds.

12. The method of claim 11,
wherein each of the drag and drop operations indicates a drag and drop operation from a source video data segment icon of the video data segment icons onto a target sequence position icon of the sequence position icons, and
wherein the processor updating the puzzle results data includes:
for each of the drag and drop operations,
the processor determining whether the position in the sequence of the video data segment to which the source video data segment icon corresponds is the same as the position in the sequence to which the target sequence position icon corresponds, and
on a condition that the position in the sequence of the video data segment to which the source video data segment icon corresponds is the same as the position in the sequence to which the target sequence position icon corresponds, the processor updating the puzzle results data to indicate that the user has correctly indicated the position in the sequence of the video data segment to which the source video data segment icon corresponds.

13. The method of claim 6, wherein the method is performed in a desktop computer, a laptop computer, a cellular phone, or a tablet computer.

14. A computing device for displaying a video puzzle and determining whether the video puzzle has been solved based on input from a user, the computing device comprising:
a memory device configured to store data that represents a plurality of video data segments that make up a video and data that indicates an ordered sequence of the video data segments in the video and puzzle results data that indicates whether the user has correctly indicated the positions of the video data segments in the sequence; and
a processor configured to:
display, via a display device, a video puzzle display area that includes information related to the video puzzle; and
receive, via an input device, user input data from the user, wherein the user input data indicates positions of the video data segments in the sequence;
update the puzzle results data based on the data that indicates the sequence of the video data segments in the video; and
determine that the video puzzle has been solved when the user input data indicates that the user has correctly indicated the positions of all of the video data segments in the sequence.

15. The computing device of claim 14, wherein the processor is further configured to display, via the display device, information that indicates that the video puzzle has been solved.

16. The computing device of claim 14, wherein the video is a music video, a feature-length film, a documentary video, or a commercial video.

17. The computing device of claim 14,
wherein the processor is further configured to determine that the video puzzle has been solved based on the puzzle results data.

18. The computing device of claim 17,
wherein the video puzzle display area includes a plurality of video data segment icons and a plurality of sequence positions icons,
wherein each of the video data segment icons corresponds to a video data segment of the video data segments,
wherein each of the sequence position icons corresponds to a position in the sequence,
wherein each of the video data segments includes a plurality of frames,
wherein each of the video data segment icons includes at least one frame from the video data segment to which the video data segment icon corresponds,
wherein the user input data includes drag and drop operations from the video data segment icons to the sequence position icons,
wherein the processor is further configured to receive a second user input data that indicates that a video data segment icon of the video data segment icons has been selected, and
wherein the processor is further configured to play an audio clue for solving the video puzzle via an audio device in response to the second user input data.

19. The computing device of claim 18,
wherein each of the drag and drop operations indicates a drag and drop operation from a source video data segment icon of the video data segment icons onto a target sequence position icon of the sequence position icons, and
wherein the processor is further configured to update the puzzle results data by:
for each of the drag and drop operations,
determining whether the position in the sequence of the video data segment to which the source video data segment icon corresponds is the same as the position in the sequence to which the target sequence position icon corresponds, and
on a condition that the position in the sequence of the video data segment to which the source video data segment icon corresponds is the same as the position in the sequence to which the target sequence position icon corresponds, updating the puzzle results data to indicate that the user has correctly indicated the position in the sequence of the video data segment to which the source video data segment icon corresponds.

20. The computing device of claim 14, wherein the computing device is a desktop computer, a laptop computer, a cellular phone, or a tablet computer.

* * * * *